United States Patent Office 3,358,002
Patented Dec. 12, 1967

3,358,002
NOVEL PYRANS
Morton Herbert Litt, Morristown, and George Joseph Schmitt, Madison, N.J., assignors to Allied Chemical Corporation, New York, N.Y., a corporation of New York
No Drawing. Filed Mar. 18, 1965, Ser. No. 440,934
9 Claims. (Cl. 260—345.9)

ABSTRACT OF THE DISCLOSURE

This invention relates to new dihydro-2-H-pyrans having a hydroxyfluoroalkyl substituent at the 2-position and fluoroalkyl substituents at the 6-position and to polymers derived therefrom. The dihydro-2-H-pyrans of this invention can be epoxidized by reaction with epichlorohydrin. These epoxides can be polymerized to form fluorinated polymers which are useful as water-repellent coatings.

---

The compounds provided by the present invention have the formula

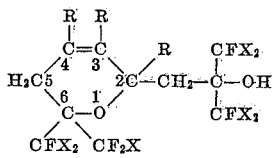

wherein R at each occurrence is a member independently selected from the group consisting of hydrogen and hydrocarbon radicals, said hydrocarbon radicals preferably being alkyl, aryl, aralkyl, and alkaryl groups of 1 to 10 carbon atoms; and X is a member selected from the group consisting of fluorine and chlorine. These compounds can be prepared by admixing under substantially anhydrous conditions a fluorine-substituted perhalogenated acetone containing at least three fluorine atoms with 1,4-pentadiene or a substituted derivative thereof as illustrated by the following equation:

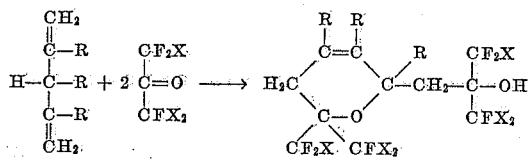

wherein R and X have the meanings given above.

Illustrative of suitable perhalogenated acetones are the following:

 Hexafluoroacetone

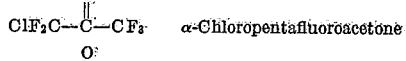 α-Chloropentafluoroacetone

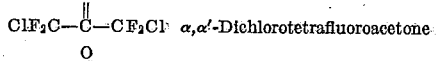 α,α′-Dichlorotetrafluoroacetone

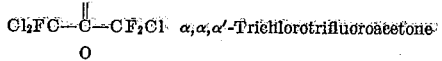 α,α,α′-Trichlorotrifluoroacetone

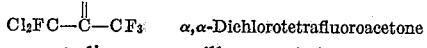 α,α-Dichlorotetrafluoroacetone

Suitable pentadienes are illustrated by 1,4-pentadiene; 2,3-diethyl-1,4-pentadiene; 2,3-diphenyl-1,4-pentadiene; 2-(p-tolyl)-1,4-pentadiene; 2-benzyl-1,4-pentadiene; and 2,3,4-trimethyl-1,4-pentadiene.

The reaction between the perhalogenated acetone and the diolefin is preferably conducted under substantially anhydrous conditions. The presence of water or any electron-donating material such as ammonia, amines or alcohols will tend to interact with an equivalent number of perhalogenated acetone molecules to form complexes which render the acetone molecule less active. Water and the other inhibiting materials can be removed by conventional drying and purification procedures. A convenient way of excluding extraneous inhibitors is to mix the reagents with a suitable drying agent and then distill said reagents directly into the reactor. Preferably at least two mols of perhalogenated acetone are employed for each mol of diolefin.

The temperature at which the reaction is conducted can be varied from about 0° to 250° C., with the preferred temperature range being about 20° to 200° C. The rate of reaction and over-all conversion increases at a given temperature as the fluorine content of the acetone is increased. Thus, the higher the fluorine content, the lower the temperature at which a reasonable reaction rate can be obtained. If less than three fluorine atoms are present in the perhalogenated acetone, temperatures necessary to secure any appreciable reaction are generally near the decomposition temperature of the resultant product, thereby making the process unfeasible.

In the preferred mode of operation, the process is carried out in the absence of any solvent, but if control of the reaction rate is desired, inert or organic solvents which will not inactivate the carbonyl group of the perhalogenated acetones may be used. Suitable solvents include aromatic and aliphatic hydrocarbons such as benzene, toluene, xylene, pentane, hexane, and petroleum ether, as well as ethers such as tetrahydrofuran, and nitriles such as acetonitrile. The presence of such solvents acts to slow down the reaction rate of the process by diluting the reactants and by complex formation of the solvent with the perhalogenated acetone.

The dihydro-2-H-pyrans of this invention can be epoxidized by reaction with epichlorohydrin. These oxides can be polymerized to form fluorinated polymers which are useful as water-repellent coatings.

The following examples are given to further illustrate the invention, but it is to be understood that the invention is not to be limited in any way by the details described therein.

Example 1

0.2 mol of α,α′-dichlorotetrafluoroacetone and 0.1 mol of 1,4-pentadiene was distilled under vacuum into a dry graduated tube, which was then sealed. The reaction mixture was maintained at 60° C. for 184 hours. The tube was opened and the resultant product distilled over a spinning band column. Two main fractions distilled off, the first being 6,6-di(chlorodifluoromethyl)-5,6-dihydro-2-[β,β-di(chlorodifluoromethyl)-β-hydroxyethyl]-2-H-pyran having the structure

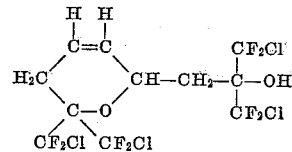

as confirmed by infrared analysis. The product had a boiling point of 80° to 82° C./0.07 mm. and a refractive index $n_D^{27\,°C.} = 1.4297$.

The elemental analysis was as follows. Theoretical: C, 28.3%; H, 1.71%; Cl, 30.5%. Found: C, 28.6%; H, 2.17%; Cl, 31.5%.

Example 2

0.25 mol of 1,4-pentadiene and 0.55 mol of hexafluoroacetone were distilled under vacuum into a dry graduated tube and sealed. The reactants were maintained at room temperature for 45 hours and then at 60° C. for an additional 67 hours. The tube was opened and the contents

3 distilled over a spinning band column. The main component obtained was 6,6-di(trifluoromethyl)-5,6-dihydro-2-[β,β-di(trifluoromethyl)-β-hydroxyethyl] - 2 - H - pyran having the structure

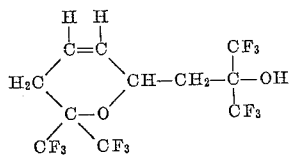

This compound had a boiling point of 49° to 50° C./0.07 mm. and a refractive index $n_D^{24°\,C.}=1.3505$.

Elemental analysis results were as follows. Theoretical: C, 34.4%; H, 2.1%. Found: C, 33.4%; H, 2.5%.

The following example illustrates the preparation of water-repellent coatings from the dihydro-2-H-pyrans of the present invention. An epoxide is first prepared by reaction of the hydroxy group of the dihydro-2-H-pyran with epichlorohydrin. This epoxide is then polymerized using a Lewis acid such as ferric chloride as the ring-opening catalyst. The resulting polymer can be applied to the surface to be coated by solution coating using a solvent such as acetone.

*Example 3*

0.456 mol of the product obtained from Example 2, 9.12 mols of epichlorohydrin, and 25 ml. of water were charged to a two-liter, round-bottom flask fitted with a stirrer, thermometer, nitrogen inlet tube, and condenser. The reaction mixture was brought to 85° C. and maintained at this temperature with stirring for 1 hour, during which time 20 grams of sodium hydroxide pellets were added. Stirring was continued for an additional 3.5 hours. Excess epichlorohydrin and water were removed by distillation under vacuum below 45° C. Acetone was added and the salt removed by filtration. This product was a fairly viscous, yellow liquid. Additional acetone was added, water removed with molecular sieves, and the solution decolorized with charcoal. The acetone was removed in a vacuum oven, yielding a liquid product which was determined to be 6,6-di(trifluoromethyl) - 5,6 - dihydro - 2 - [β,β-di(trifluoromethyl)-β-oxyethyl glycidyl ether]-2-H-pyran.

Elemental analysis of the product was as follows. Theoretical: C, 36.8%; H, 2.6%. Found: C, 36.8%; H, 2.7%. These results show the compound from Example 2 was epoxidized almost completely.

Five milliliters of the epoxide were put in a tube with powdered anhydrous ferric chloride, sealed under vacuum, and placed in a bath maintained at 65° C. A low molecular weight polymer was obtained. Upon application of the polymer from acetone solution to cloth and paper, they were rendered water repellent.

It will be apparent that many modifications and variations can be effected without departing from the scope of the novel concepts of the present invention, and the illustrative details disclosed are not to be construed as imposing undue limitations on the invention.

We claim:
1. A compound of the formula

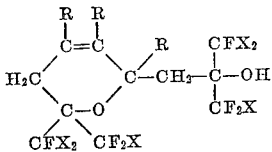

wherein R at each occurrence is a member independently selected from the group consisting of hydrogen and hydrocarbon radicals selected from the group consisting of alkyl, aryl, aralkyl, and alkaryl radicals of 1 to 10 carbon atoms, and X is a member selected from the group consisting of chlorine and fluorine.

2. A compound of the formula

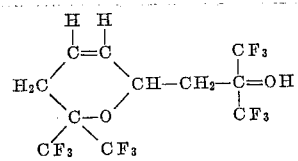

3. A compound of the formula

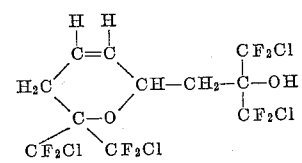

4. A compound of the formula

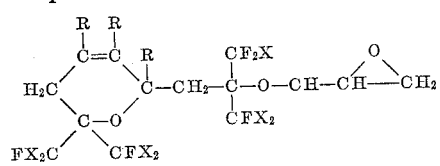

wherein R at each occurrence is a member independently selected from the group consisting of hydrogen and hydrocarbon radicals selected from the group consisting of alkyl, aryl, aralkyl, and alkaryl groups of 1 to 10 carbon atoms, and X is a member selected from the group consisting of chlorine and fluorine.

5. A compound of the formula

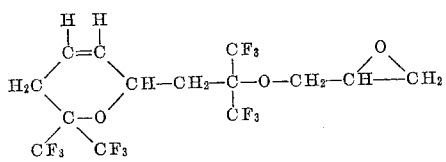

6. The polymerized product obtained by the polymerization of the compound of claim 4 in the presence of a Lewis acid.

7. The polymerized product obtained by the polymerization of the compound of claim 5 in the presence of a Lewis acid.

8. A process for the preparation of a fluorine-substituted dihydro-2-H-pyran which comprises reacting at a temperature of 0° to 250° C. a perhalogenated acetone containing at least three fluorine atoms with a 1,4-pentadiene which has at each of the 2-, 3- and 4-positions a member selected from the group consisting of hydrogen and hydrocarbon radicals and is otherwise unsubstituted.

9. A process for the preparation of a fluorine-substituted dihydro-2-H-pyran which comprises reacting a perhalogenated acetone of the formula

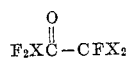

wherein X is a member selected from the group consisting of chlorine and fluorine with a diolefin of the formula $$CH_2=CH—CHR—CR=CH_2$$

wherein R is a member selected from the group consisting of hydrogen and hydrocarbon radicals, said reaction being carried out under substantially anhydrous conditions at a temperature of 20° to 200° C.

References Cited

UNITED STATES PATENTS

| | | | |
|---|---|---|---|
| 2,422,648 | 6/1947 | Williams et al. | 260—88.3 |
| 2,905,699 | 9/1959 | Kubler | 260—345.9 |
| 3,287,372 | 11/1966 | Blannock | 260—345.9 |

WALTER A. MODANCE, *Primary Examiner.*

JOHN M. FORD, *Assistant Examiner.*